No. 748,356. Patented December 29, 1903.

UNITED STATES PATENT OFFICE.

HERMANN EGGERS, OF WEST HOBOKEN, NEW JERSEY.

FUEL-SAVING BRIQUET.

SPECIFICATION forming part of Letters Patent No. 748,356, dated December 29, 1903.

Application filed January 27, 1903. Serial No. 140,785. (No model.)

*To all whom it may concern:*

Be it known that I, HERMANN EGGERS, a citizen of the United States, residing in Homestead, West Hoboken, in the county of Hudson and State of New Jersey, have invented certain new and useful Improvements in Fuel-Saving Briquets, of which the following is a specification.

This invention relates to an improved briquet which is intended to be mixed with the fuel and charged with the same to the grates of steam-boilers, ranges, cooking and heating stoves, said briquets producing the more perfect combustion of the coal, and thereby a considerable saving in the same; and the invention consists of a fuel-saving briquet composed of a mixture of clay, sand, and a binding medium, to which is added coal-dust and a suitable coloring-matter.

In making my improved fuel-saving briquets one part of screened clay, one part of sand, and one-quarter part of screened coal-dust are mixed together with a binding medium, such as glue, soluble glass, and a small quantity of anilin-black or other suitable coloring-matter. The binding medium is mixed with water to a solution of suitable consistency and this solution then mixed with the other ingredients in a suitable mixing-machine. The quantity of the binding medium varies according to the substance used, but has to be sufficient so that its solution in water forms a thick mass or paste with the other ingredients. The mass while in a plastic state is then pressed into the form of briquets by any approved coal-briquet machine and the briquets then subjected to heat until perfectly dry. They may be pressed into any suitable form; but the usual oval form of briquets is preferred. The briquets present a black color somewhat similar to coal.

The improved fuel-saving briquets are mixed with the fuel at an average of two or three briquets for each square foot of grate-surface. They are heated by the fuel to red heat and rendered porous, owing to the combustion of the coal-dust and other organic matter in the same. The mixing of these briquets with the fuel has the advantage that a more perfect combustion of the fuel is produced, as the briquets form centers of combustion for the adjacent coal, facilitating access of air to the same and increasing thereby not only the effective heating action of the fire, but also producing a considerable economy in the use of coal. The briquets are removed with the ashes and can be used over and over again until they gradually break apart.

Another advantage of the improved fuel-saving briquets is that they keep up the fire with greater ease over night and prevent the formation of clinkers. They can be used for furnaces for steam-boilers as well as for the fireplaces of ranges and stoves, producing the same economical results in either case. As they can be furnished at a very small expense, they form a very valuable accessory for the economic combustion of hard and other coal and a great convenience to housekeepers.

Having thus described my invention, I claim as new and desire to secure by Letters Patent—

1. A non-combustible fuel-saving briquet, consisting of a dry compacted mixture of clay, sand, and a binding medium, substantially as set forth.

2. A non-combustible fuel-saving briquet, consisting of a dry compacted mixture of one part of clay, one part of sand, and a binding medium, substantially as set forth.

In testimony that I claim the foregoing as my invention I have signed my name in presence of two subscribing witnesses.

HERMANN EGGERS.

Witnesses:
PAUL GOEPEL,
HENRY J. SUHRBIER.